US00RE36362E

United States Patent [19]

Jackson

[11] E Patent Number: Re. 36,362

[45] Reissued Date of Patent: Nov. 2, 1999

[54] POLYMER LINERS IN ROD PUMPING WELLS

[76] Inventor: William Evans Jackson, 6249 Riders Rd., Odessa, Tex. 79762

[21] Appl. No.: 09/069,646

[22] Filed: Apr. 29, 1998

Related U.S. Patent Documents

Reissue of:

[64] Patent No.: 5,511,619
Issued: Apr. 30, 1996
Appl. No.: 08/350,475
Filed: Dec. 7, 1994

[51] Int. Cl.[6] ..... E21B 17/00; E21B 43/00

[52] U.S. Cl. ..... 166/369; 166/68; 166/242.1; 138/140; 138/146; 92/170.1

[58] Field of Search ..... 166/42, 68, 68.5, 166/105, 242.1, 369, 380, 902; 138/140, 141, 143, 146; 92/170.1

[56] References Cited

U.S. PATENT DOCUMENTS

| | | | |
|---|---|---|---|
| 4,308,917 | 1/1982 | Dismukes | 166/381 |
| 4,581,919 | 4/1986 | Sullivan | 73/49.5 |
| 4,773,479 | 9/1988 | Guy | 166/242.4 |
| 4,793,409 | 12/1988 | Bridges et al. | 166/57 |
| 4,852,655 | 8/1989 | Guy | 166/380 |
| 4,858,688 | 8/1989 | Edwards et al. | 166/241.4 |
| 4,938,285 | 7/1990 | Edwards et al. | 166/241.4 |
| 5,099,917 | 3/1992 | Roser | 166/51 |
| 5,110,644 | 5/1992 | Sparks et al. | 428/36.3 |
| 5,219,028 | 6/1993 | Martin et al. | 166/380 |
| 5,271,974 | 12/1993 | Upchurch | 138/146 X |
| 5,351,752 | 10/1994 | Wood et al. | 166/68 |

OTHER PUBLICATIONS

Composite Catalog of Oilfied Services, "AMF Tuboscope, Inc.", vol. 1, pp. 156–158, 1984.

*Primary Examiner*—David J. Bagnell
*Attorney, Agent, or Firm*—Sidley & Austin

[57] ABSTRACT

The installation of an abrasion resistent polymer liner in the production tubing string of a well which is being produced by rod pumping for the principal purpose of reducing rod wear on the tubing string, and wear on the rods and/or the rod couplings. In a preferred embodiment of the invention, the polymer liner is characterized by an extruded polymer material having a high density, which is abrasive resistant, and which has a coefficient of friction that is much lower than the coefficient of friction of metal tubing, such as high density polyethylene.

20 Claims, 1 Drawing Sheet

POLYMER LINERS IN ROD PUMPING WELLS

Matter enclosed in heavy brackets [ ] appears in the original patent but forms no part of this reissue specification; matter printed in italics indicates the additions made by reissue.

TECHNICAL FIELD OF THE INVENTION

The present invention pertains in general to oil field production equipment and in particular to the use of polymer liners in rod pumping wells.

BACKGROUND OF THE INVENTION

This invention relates to production tubing strings used in oil wells that are being produced by rod pumping, which is the conventional technique for pumping oil from underground reservoirs. At the surface, a motor drives a walking beam which is connected to a polished rod that is in turn connected to a string of sucker rods which extend down the borehole to support the downhole pump. As the motor runs, the walking beam raises and lowers the polished rod and string of sucker rods which causes the pump to lift the fluid from the reservoir up to the surface.

Historically, wells which are produced with conventional rod pumping units have evidenced problems with tubing and/or rod or rod coupling failures due to the abrasion of the rods and rod couplings on the tubing walls as the rod string reciprocates. These failures may be accelerated by the presence of corrosive elements and/or by the deviation of the well bore in drilling or through subsidence. The present invention greatly reduces these failures.

In accordance with the present invention the production tubing joints in a rod-pumped well are lined with polymer liners which reduce the abrasion and failure of the tubing joints caused by the reciprocating rods. The polymer liners, such as high density polyethylene liners, have a coefficient of friction which is far superior to the coefficient of friction of steel tubing. Further, when the polyethylene liner is wetted by the produced fluid, susceptibility to abrasion is further reduced.

Although the lining of pipe and tubing with polymer liners for corrosion control has been practiced heretofore, the lining of tubing strings in rod-pumped wells to reduce the abrasion and failure of the tubing joints caused by the reciprocating rods is novel. For example, liners have been installed in pipelines for the transportation of oil, water, gas and sewage for some time. In the application of polymer lined tubing for oil field tubing strings, the application has been for the protection of tubing utilized for injection strings, water disposal strings, or production strings which flow or which are produced with electric submersible pumps.

The present invention achieves the substantial benefits of protecting the tubing string on a rod pumped well from the detrimental effects to and failures of the production tubing caused by the reciprocating rods as well as protecting the tubing against corrosive elements such as salt water, hydrogen sulfide, carbon dioxide and other corrosive elements produced in oil wells.

It is thus an objective of this invention to utilize polymer liners in the tubing production strings of rod pumping wells for the purpose of eliminating metal to metal contact between the rods, rod couplings and the production tubing string, thereby reducing the frequency of failures due to rod wear, rod coupling wear, and/or production tubing string wear.

Still another object of this invention is to provide protection of the production tubing string of an oil well produced by rod pumping from the corrosive elements of the components of the produced fluid and thereby provide an opportunity to reduce the production costs by reducing the chemical treatment of the well's producing string.

SUMMARY OF THE INVENTION

These and other objectives of the invention are provided in an improved method and system for producing well fluids from a well being produced by a rod pumping system. In accordance with the present invention a rod pumping system comprises a plurality of sucker rods (a sucker rod string) disposed within a string of tubing which extends into an oil well. Connected to the sucker rods is a downhole pump. The improved method and apparatus comprises using tubing sections having abrasion resistent polymer liners disposed within the inside bore of the tubing to eliminate contact between said sucker rods and tubing string when said sucker rods are bring reciprocated.

The preferred polymer liner material is polyethylene, especially high and ultra-high density polyethylene materials. A preferred method of disposing the polymer liners within the tubing sections includes providing a liner having a greater outer diameter than the inner diameter of the tubing, mechanically reducing the outer diameter of the liner by rollers or other known means, and pushing the liner into the tubing bore.

BRIEF DESCRIPTION OF THE DRAWINGS

For a more complete description of the present invention and the advantages thereof, reference is now made to the following description taken in conjunction with the accompanying drawings in which.

DETAILED DESCRIPTION

Figures 1, 2:
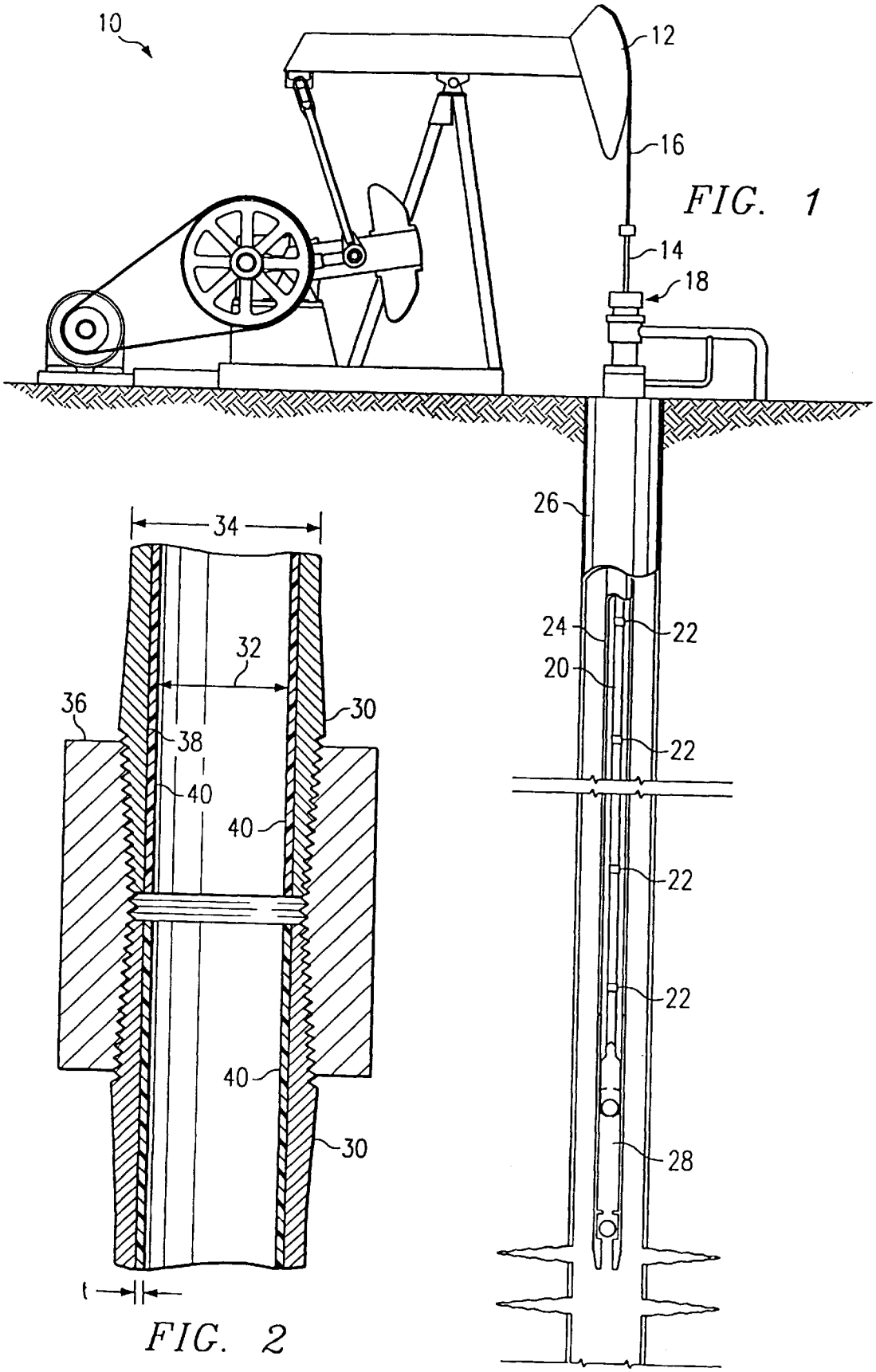
FIG. 1 is a typical rod pumping system.
FIG. 2 is a sectional view of coupled, polymer lined tubing joints.

The present invention relates to the use of polymer lined tubing strings to reduce the frictional forces between the reciprocating rods and the tubing string in a rod pumped well. To better understand the present invention a brief description of a typical rod pumping system is provided below.

Referring to FIG. 1, a rod pumping system, generally indicated by reference numeral 10, includes a walking beam horsehead 12 for reciprocating a polished rod 14 which is connected to the horsehead by cable 16. Polished rod 14 extends through a stuffing box 18. A string of sucker rods 20 connected together by couplings 22 hangs from polished rod 14 within a tubing string 24 located in a casing 26. The sucker rods 20 are connected to a subsurface pump 28. In a reciprocation cycle of the structure, including the horsehead 12, polished rod 14 and sucker rods 20, well fluids are lifted on the upstroke. As one would expect, the up and down movement of the rods within the tubing string frequently creates substantial metal to metal contact between the tubing string and the rods and rod couplings which often results in failures due to rod wear, rod coupling wear, and/or production tubing string wear. This problem and other problems inherent in rod-pumped wells are substantially eliminated or reduced by the present invention described in detail below.

In the exemplary embodiment of the present invention shown in FIG. 2, two joints of metal tubing 30, having an inner diameter 32 and outer diameter 34, are connected together by coupling 36. Disposed within each tubing joint 30 adjacent its inner surface 38 is a polymer liner 40. Polymer liners, which are typically manufactured by extrusion methods, are well known in the field and are readily available. The liner 40 may be disposed within the tubing 30 by any one of several methods known in the art. A preferred method of disposing the liner within the tubing bore is to provide a polymer liner having an outer diameter which is slightly greater than the inner diameter of the tubing section pipe having an outside diameter larger than the internal diameter of the tubing, reduce the outside diameter of the liner and insert the reduced diameter liner within the tubing. After the liner is in place it will attempt to substantially return to its original shape and will become secured within the tubing section. Those skilled in the art will recognize that numerous methods of reducing the outside diameter of the liner for insertion into a tubing section are available. For example, rollers may be used to mechanically reduce the outside diameter of the liner by the desired amount and to push the liner into the tubing joint. Other methods include pulling the liner through a sizing sleeve or orifice and pushing the reduced diameter liner into place in the tubing section.

The polymer liner 40 is constructed of a durable, abrasion resistant polymer material such as a polyethylene. High density, high and ultra-high molecular weight polyethylene pipe is preferred since it is extremely resistent to abrasive forces such as those caused by sucker rods and rod couplings in a rod pumped well. In addition to providing abrasion resistance and coefficients of friction superior to that of steel tubing, high density polyethylene polymer materials exhibit excellent self-lubricating and/or wet-lubricating characteristics thereby increasing pumping efficiency. High and ultra-high density polyethylene and high and ultra-high molecular weight polyethylene are well defined in the industry by their molecular structure and weight. Suitable polyethylene materials are disclosed in U.S. Pat. No. 4,938,285 which is hereby incorporated by reference.

The liner 42 should be sufficiently thick to provide reasonable longevity to the tubing string. Preferably, the liner thickness ranges from about 140 to about 200 millimeters. The optimum thickness of the liner will depend on the size of the tubing being used since the liner will reduce the effective inside diameter of the tubing string which affects the sizing of the pump which can be used. In the exemplary embodiment shown in FIG. 2, the thickness "t" of the liner 42 is about 150 millimeters.

It should be recognized that the present invention also provides several other benefits and advantages over conventional non-lined tubing. For example, paraffin build up is reduced since the polymer liner will provide an insulation of the production string thereby reducing the temperature loss in the production string from the bottom of the well to the well head, resulting in a reduced deposition of paraffin. Further, the present invention permits the use of a lower grade tubing than would ordinarily be utilized as the production tubing string in an oil well produced by rod pumping.

The lined tubing of the present invention may also be effectively used in combination with rod guides and/or rod coupling shields well known in the art, depending upon the well depth, deviation of the hole, rod action and other factors, to minimize the contact between the rods and/or rod couplings and the tubing walls. For example, suitable rod guides which may be used in conjunction with the polymer lined tubing of the present invention are disclosed in U.S. Pat. No. 4,938,285.

While the preferred embodiments of the invention have been described above, it will be recognized and understood that various modifications of material and form may be made and the appended claims are intended to cover all such modifications which may fall within the spirit and scope of the invention.

Having described my invention with the particularity set forth above, what is claimed is:

1. An improved method of producing well fluids from a well being produced by a rod pumping system, said rod pumping system comprising: a plurality of sucker rods disposed within a string of tubing which extends into said well, said string of tubing comprising of a plurality of tubing sections each having a bore and an inside diameter; a down hole pump operably connected to said sucker rods; and means for reciprocating said sucker rods, wherein the improved method comprises using tubing sections having polymer liners disposed within said bore of said tubing sections to eliminate contact between said sucker rods and said tubing string when said sucker rods are being reciprocated.

2. An improved method of producing well fluids from a well being produced by a rod pumping system, said rod pumping system comprising: a plurality of sucker rods disposed within a string of tubing which extends into said well, said string of tubing comprising of a plurality of tubing sections each having a bore and an inside diameter; a down hole pump operably connected to said sucker rods; and means for reciprocating said sucker rods, wherein the improved method comprises using tubing sections having polymer liners disposed within said bore of said tubing sections to eliminate contact between said sucker rods and said tubing string when said sucker rods are being reciprocated, wherein said liners comprise a polyethylene material.

3. The invention as defined in claim 2 wherein said polyethylene liners comprise a high or ultra-high density polyethylene material.

4. The invention as defined in claim 2 wherein said polyethylene liners have a thickness of between about 140 and about 200 millimeters.

5. The invention as defined in claim 2 wherein said polyethylene liners have been disposed within said bores of said tubing sections by providing a liner having an outside diameter greater than the inside diameter of said tubing section, reducing the outside diameter of said liner and inserting said liner within said bore of said tubing section.

6. An improved rod pumping system for producing well fluids from a well said rod pumping system comprising:

a. a plurality of sucker rods disposed within a string of tubing which extends into said well, said string of tubing comprising of a plurality of tubing sections each having a bore and an inside diameter;

b. a down hole pump operably connected to said sucker rods;

c. means for reciprocating said sucker rods;

d. said tubing sections having polymer liners disposed within said bore of said tubing sections to eliminate contact between said sucker rods and said tubing string when said sucker rods are being reciprocated.

7. An improved rod pumping system for producing well fluids from a well said rod pumping system comprising:

a. a plurality of sucker rod disposed within a string of tubing which extends into said well, said string of tubing comprising of a plurality of tubing sections each having a bore and an inside diameter;

b. a down hole pump operably connected to said sucker rods;

c. means for reciprocating said sucker rods;

d. said tubing sections having polymer liners disposed within said bore of said tubing sections to eliminate contact between said sucker rods and said tubing string when said sucker rods are being reciprocated, wherein said liners comprise a polyethylene material.

8. The invention as defined in claim 7 wherein said liners comprise a high or ultra-high density polyethylene material.

9. The invention as defined in claim 7 wherein said polyethylene liners have a thickness of between about 140 and about 200 millimeters.

10. The invention as defined in claim 7 wherein said polyethylene liners have been disposed within said bores of said tubing sections by providing a liner having an outside diameter greater than the inside diameter of said tubing section, reducing the outside diameter of said liner and inserting said liner within said bore of said tubing section.

*11. An improved method of producing well fluids from a well being produced by a rod-pumping system said rod-pumping system comprising: a plurality of sucker rods disposed within a string of tubing which extends into said well said string of tubing comprising of a plurality of tubing sections each having a bore and an inside diameter; and a down-hole pump operably connected to said sucker rods, wherein the improved method comprises using tubing sections having polymer liners disposed within said bore of said tubing sections to eliminate contact between said sucker rods and said tubing string when said sucker rods are being moved relative to said string of tubing to produce fluids from said well.*

*12. The invention defined in claim 11, said polymer liners comprising a polyethylene material.*

*13. The invention defined in claim 12 wherein said polyethylene material comprises a high or ultra high density polyethylene material.*

*14. The invention as defined in claim 12 wherein said polyethylene liners have a thickness of between about 140 and about 200 millimeters.*

*15. The invention as defined in claim 12 wherein said polyethylene liners have been disposed within said bores of said tubing sections by providing a liner having an outside diameter greater than the inside diameter of said tubing section, reducing the outer diameter of said liner and inserting said liner within said bore of said tubing section.*

*16. An improved rod-pumping system for producing well fluids from a well said rod-pumping system comprising:*

*a. a plurality of sucker rods disposed within a string of tubing which extends into said well said string of tubing comprising of a plurality of tubing sections each having a bore and an inside diameter;*

*b. a down-hole pump operably connected to said sucker rods to produce fluid from said well when said sucker rods are moved relative to said tubing sections; and*

*c. said tubing sections having polymer liners disposed within said bore of said tubing sections to eliminate contact between said sucker rods and said tubing string when said sucker rods are being moved relative to said string of tubing.*

*17. The invention as defined in claim 16 wherein said polymer liners comprise a polyethylene material.*

*18. The invention as defined in claim 17 wherein said polyethylene material comprises a high or ultra high density polyethylene material.*

*19. The invention as defined in claim 17 wherein said polyethylene liners have a thickness of between about 140 and about 200 millimeters.*

*20. The invention as defined in claim 17 wherein said polyethylene liners have been disposed within said bores of said tubing sections by providing a liner having an outside diameter greater than the inside diameter of said tubing section reducing the outside diameter of said liner and inserting said liner within said bore of said tubing section.*

* * * * *